United States Patent
Haller

(10) Patent No.: US 10,065,541 B2
(45) Date of Patent: Sep. 4, 2018

(54) HORIZONTAL VIBRATION DEVICE FOR A VEHICLE SEAT

(71) Applicant: GRAMMER AG, Amberg (DE)

(72) Inventor: Erwin Haller, Birgland (DE)

(73) Assignee: GRAMMER AG, Amberg (DE)

( * ) Notice: Subject to any disclaimer, the term of this patent is extended or adjusted under 35 U.S.C. 154(b) by 99 days.

(21) Appl. No.: 15/229,443

(22) Filed: Aug. 5, 2016

(65) Prior Publication Data
US 2017/0043693 A1    Feb. 16, 2017

(30) Foreign Application Priority Data

Aug. 10, 2015  (DE) .................. 10 2015 113 176

(51) Int. Cl.
| | | |
|---|---|---|
| F16M 13/00 | (2006.01) | |
| B60N 2/52 | (2006.01) | |
| B60N 2/50 | (2006.01) | |

(52) U.S. Cl.
CPC .............. B60N 2/527 (2013.01); B60N 2/509 (2013.01)

(58) Field of Classification Search
USPC ........................................................ 248/550
See application file for complete search history.

(56) References Cited

U.S. PATENT DOCUMENTS

| | | |
|---|---|---|
| 203,739 A | 5/1878 | Kilburn |
| 1,544,248 A | 6/1925 | Liebl |
| 1,607,164 A | 11/1926 | Leipert et al. |
| 1,945,801 A | 2/1934 | Briggs |
| 1,948,476 A | 2/1934 | Saurer |
| 2,489,981 A | 3/1946 | Rose |
| 2,559,105 A | 7/1951 | Banning, Jr. |
| 2,607,397 A | 8/1952 | Schneider |
| 2,682,931 A | 7/1954 | Young |
| 2,686,667 A | 8/1954 | Willison et al. |
| 2,823,730 A | 2/1958 | Lwarence |
| 2,933,127 A | 4/1960 | Brewster |
| 2,982,336 A | 5/1961 | Minici |

(Continued)

FOREIGN PATENT DOCUMENTS

| | | |
|---|---|---|
| CN | 1466525 | 1/2004 |
| CN | 101865237 | 10/2010 |

(Continued)

OTHER PUBLICATIONS

Official Action with English translation for China Patent Application No. 201610642280.5, dated Apr. 11, 2018, 3 pages.

*Primary Examiner* — Monica E Millner
(74) *Attorney, Agent, or Firm* — Sheridan Ross PC

(57) ABSTRACT

The invention relates to a horizontal vibration device for a vehicle seat, comprising a damper module which damps horizontal vibrations between a seat-side upper part and a body-side lower part in the longitudinal direction of the vehicle and/or in the width direction of the vehicle, and comprising a regulating/control module for regulating and/or controlling the damper module, said damper module being arranged in an interspace between the seat-side upper part and the body-side lower part. The horizontal vibration device is further characterized in that the damper module comprises at least one hydraulic vibration damper, said at least one hydraulic vibration damper being fluidically connected to a volume equalizing module.

16 Claims, 8 Drawing Sheets

(56) References Cited

U.S. PATENT DOCUMENTS

| | | | |
|---|---|---|---|
| 3,006,594 A | 10/1961 | Gruendler |
| 3,046,053 A | 7/1962 | Pearlstine |
| 3,134,568 A | 5/1964 | Carson |
| 3,208,085 A | 9/1965 | Grimshaw |
| 3,298,654 A | 1/1967 | Dome |
| 3,436,042 A | 4/1969 | Van Goubergen |
| 3,578,376 A | 5/1971 | Hasegawa et al. |
| 3,608,855 A | 11/1971 | Osenberg |
| 3,697,128 A | 10/1972 | Strien et al. |
| 3,724,603 A | 4/1973 | Shiomi et al. |
| 3,752,432 A | 8/1973 | Lowe |
| 3,756,556 A | 9/1973 | Georgi |
| 3,765,676 A | 10/1973 | Bearson et al. |
| 3,788,697 A | 1/1974 | Barton et al. |
| 3,802,737 A | 4/1974 | Mertens |
| 3,826,457 A | 7/1974 | Huot de Longchamp |
| 3,847,338 A | 11/1974 | Adams |
| 3,882,956 A | 5/1975 | Plegat |
| 3,883,172 A | 5/1975 | Barton et al. |
| 3,917,209 A | 11/1975 | Adams |
| 3,982,718 A | 9/1976 | Folkenroth et al. |
| 4,002,315 A | 1/1977 | Van Goubergen |
| 4,022,411 A | 5/1977 | Rumsey |
| 4,072,287 A | 2/1978 | Swenson et al. |
| 4,125,242 A | 11/1978 | Meiller et al. |
| 4,183,492 A | 1/1980 | Herman |
| 4,257,626 A | 3/1981 | Adomeit |
| 4,273,213 A | 6/1981 | Munz |
| 4,286,765 A | 9/1981 | Delgleize et al. |
| 4,349,167 A | 9/1982 | Reilly |
| 4,350,317 A | 9/1982 | Aondetto |
| 4,440,441 A | 4/1984 | Marrujo et al. |
| 4,461,444 A | 7/1984 | Grassl et al. |
| 4,475,707 A | 10/1984 | Foster |
| 4,487,383 A | 12/1984 | Mazelsky |
| 4,500,076 A | 2/1985 | Rova |
| 4,519,591 A | 5/1985 | Bush et al. |
| 4,529,158 A | 7/1985 | Sautter, Jr. |
| 4,678,155 A | 7/1987 | Carter |
| 4,679,760 A | 7/1987 | Dotzler et al. |
| 4,684,100 A | 8/1987 | Grassl |
| 4,685,731 A | 8/1987 | Migut |
| 4,700,921 A | 10/1987 | Holbrook |
| 4,714,227 A | 12/1987 | Holm et al. |
| 4,784,434 A | 11/1988 | Iwami |
| 4,828,216 A | 5/1989 | Van Duser |
| 4,836,342 A * | 6/1989 | Wolfe .................... F16F 9/46 |
| | | 188/282.4 |
| 4,842,257 A | 6/1989 | Abu-Isa et al. |
| 4,856,763 A | 8/1989 | Brodersen et al. |
| 4,859,148 A | 8/1989 | Hibyan |
| 4,911,381 A | 3/1990 | Cannon et al. |
| 4,927,119 A | 5/1990 | Frost |
| 4,954,051 A | 9/1990 | Smith et al. |
| 4,958,812 A | 9/1990 | Wolf et al. |
| 5,004,206 A | 4/1991 | Anderson |
| 5,014,960 A | 5/1991 | Kimura |
| 5,042,783 A | 8/1991 | Ciolczyk et al. |
| 5,054,753 A | 10/1991 | Polus |
| 5,087,503 A | 2/1992 | Meatto |
| 5,123,625 A | 6/1992 | Spaltofski |
| 5,127,699 A | 7/1992 | Maezawa et al. |
| 5,169,112 A * | 12/1992 | Boyles .................... B60N 2/501 |
| | | 248/406.2 |
| 5,194,111 A | 3/1993 | Meatto |
| 5,211,369 A | 5/1993 | Hoerner |
| 5,221,071 A | 6/1993 | Hill |
| 5,222,709 A | 6/1993 | Culley, Jr. et al. |
| 5,251,864 A | 10/1993 | Itou |
| 5,324,095 A | 6/1994 | Yamauchi |
| 5,331,750 A | 7/1994 | Sasaki et al. |
| 5,338,090 A | 8/1994 | Simpson et al. |
| 5,344,210 A | 9/1994 | Marwan et al. |
| 5,358,210 A | 10/1994 | Simon et al. |
| 5,358,305 A * | 10/1994 | Kaneko .................... B60N 2/0224 |
| | | 180/89.14 |
| 5,368,118 A | 11/1994 | Hoefle |
| 5,437,494 A | 8/1995 | Beauvais |
| 5,449,218 A | 9/1995 | Beauvais et al. |
| 5,531,404 A | 7/1996 | Marechal |
| 5,553,911 A | 9/1996 | Bodin et al. |
| 5,555,501 A | 9/1996 | Furihata et al. |
| 5,582,385 A * | 12/1996 | Boyle .................... B60G 17/018 |
| | | 188/266.1 |
| 5,632,208 A | 5/1997 | Weber |
| 5,651,585 A | 7/1997 | Van Duser |
| 5,653,505 A | 8/1997 | Holobaugh, Jr. |
| 5,657,950 A | 8/1997 | Han et al. |
| 5,676,424 A | 10/1997 | Winkelhake |
| 5,730,492 A | 3/1998 | Warrick et al. |
| 5,735,509 A * | 4/1998 | Gryp .................... B60N 2/501 |
| | | 248/550 |
| 5,743,592 A | 4/1998 | Bedouch |
| 5,758,859 A | 6/1998 | Gonzalez |
| 5,871,198 A | 2/1999 | Bostrom et al. |
| 5,871,257 A | 2/1999 | Dundes, Sr. |
| 5,899,288 A | 5/1999 | Schubert et al. |
| 5,967,604 A | 10/1999 | Yoshida |
| 5,975,508 A * | 11/1999 | Beard .................... B60N 2/501 |
| | | 180/89.12 |
| H001833 H | 2/2000 | Hoppel et al. |
| 6,056,362 A | 5/2000 | De La Haye |
| 6,120,082 A * | 9/2000 | Vandermolen .......... B60N 2/02 |
| | | 248/550 |
| 6,186,467 B1 * | 2/2001 | Wahls .................... B60N 2/502 |
| | | 248/157 |
| 6,286,821 B1 | 9/2001 | Schaffer |
| 6,309,020 B1 | 10/2001 | Niikura et al. |
| 6,354,556 B1 | 3/2002 | Ritchie et al. |
| 6,371,456 B1 * | 4/2002 | Ritchie .................... B60N 2/501 |
| | | 248/550 |
| 6,412,864 B1 | 7/2002 | Larson |
| 6,478,102 B1 | 11/2002 | Puterbaugh et al. |
| 6,554,359 B2 | 4/2003 | Kohl et al. |
| 6,582,015 B2 | 6/2003 | Jessup et al. |
| 6,595,570 B2 | 7/2003 | Susko |
| 6,725,983 B2 | 4/2004 | Bell |
| 6,758,294 B2 | 7/2004 | Peddycord et al. |
| 6,773,049 B2 | 8/2004 | Rupiper et al. |
| 6,783,835 B2 | 8/2004 | McCollough et al. |
| 6,857,674 B2 | 2/2005 | Chareyre |
| 6,935,693 B2 | 8/2005 | Janscha et al. |
| 7,017,888 B2 | 3/2006 | Platner et al. |
| 7,044,553 B2 | 5/2006 | Ropp |
| 7,077,226 B2 | 7/2006 | Oliver et al. |
| 7,077,227 B2 | 7/2006 | Oliver et al. |
| 7,080,881 B2 | 7/2006 | Williamson et al. |
| 7,185,867 B2 | 3/2007 | Hill et al. |
| 7,201,367 B2 | 4/2007 | Wietharn |
| 7,240,754 B2 | 7/2007 | Barta et al. |
| 7,300,100 B2 | 11/2007 | McLean et al. |
| 7,331,627 B2 | 2/2008 | Van Den Brink et al. |
| 7,338,126 B2 | 3/2008 | Ropp |
| 7,452,019 B1 | 11/2008 | Day |
| 7,469,861 B2 | 12/2008 | Ferry et al. |
| 7,478,879 B2 | 1/2009 | Robinson |
| 7,484,805 B2 | 2/2009 | Baum |
| 7,568,675 B2 * | 8/2009 | Catton .................... B60N 2/502 |
| | | 248/421 |
| 7,744,149 B2 | 6/2010 | Murray et al. |
| 7,770,974 B2 * | 8/2010 | Ott .................... B60N 2/501 |
| | | 297/344.15 |
| 7,882,914 B2 | 2/2011 | Scheele et al. |
| 7,883,135 B2 | 2/2011 | Ravid et al. |
| 7,886,882 B2 | 2/2011 | Behmenburg et al. |
| 7,887,033 B2 * | 2/2011 | Shoemaker .......... B60N 2/501 |
| | | 267/136 |
| 7,950,726 B2 | 5/2011 | Brown |
| 7,997,600 B2 | 8/2011 | Haller et al. |
| 8,061,770 B2 | 11/2011 | Houston et al. |
| 8,095,268 B2 | 1/2012 | Parison et al. |
| 8,182,038 B2 | 5/2012 | Haller |

(56) References Cited

U.S. PATENT DOCUMENTS

| | | | |
|---|---|---|---|
| 8,186,475 B2 | 5/2012 | Sugden et al. | |
| 8,225,903 B2 | 7/2012 | Dunn | |
| 8,226,163 B1 | 7/2012 | Pearson et al. | |
| 8,261,869 B2 | 9/2012 | Turco et al. | |
| 8,265,832 B2 | 9/2012 | Haller et al. | |
| 8,469,450 B2 | 6/2013 | Wahls et al. | |
| 8,534,646 B2 | 9/2013 | Bauer et al. | |
| 8,607,910 B2 | 12/2013 | Haller et al. | |
| 8,622,362 B2* | 1/2014 | Keen | B60N 2/501 248/421 |
| 8,662,588 B1 | 3/2014 | Delmestri | |
| 8,678,508 B2 | 3/2014 | Kolb | |
| 8,800,977 B2 | 8/2014 | Kolb | |
| 8,926,012 B2 | 1/2015 | Kaessner | |
| 8,960,802 B2 | 2/2015 | Himmelhuber | |
| 8,973,967 B2 | 3/2015 | Kolb | |
| 9,266,452 B2 | 2/2016 | Haller et al. | |
| 9,376,042 B2 | 6/2016 | Kolb | |
| 9,566,886 B2* | 2/2017 | Lorey | B60N 2/502 |
| 9,688,173 B2* | 6/2017 | Ulrich | B60N 2/52 |
| 9,809,136 B2* | 11/2017 | Haller | B60N 2/501 |
| 2002/0033622 A1 | 3/2002 | Jarnail et al. | |
| 2004/0090100 A1 | 5/2004 | Igarashi | |
| 2004/0112659 A1 | 6/2004 | Kramer et al. | |
| 2004/0144906 A1* | 7/2004 | Hill | B60N 2/502 248/421 |
| 2005/0051373 A1 | 3/2005 | Bernhardt et al. | |
| 2005/0110243 A1* | 5/2005 | Meier | B60N 2/002 280/727 |
| 2005/0224269 A1 | 10/2005 | Dahl | |
| 2006/0061022 A1 | 3/2006 | Chang et al. | |
| 2006/0208401 A1 | 9/2006 | Reast | |
| 2006/0237885 A1 | 10/2006 | Paillard et al. | |
| 2007/0023244 A1* | 2/2007 | Carlson | A47C 1/03 188/267 |
| 2007/0040311 A1 | 2/2007 | Maas | |
| 2007/0278025 A1* | 12/2007 | Shoemaker | B60N 2/501 180/89.13 |
| 2007/0278057 A1* | 12/2007 | Wereley | B60N 2/4242 188/267.1 |
| 2007/0284927 A1* | 12/2007 | Therer | B60N 2/1665 297/344.12 |
| 2008/0088165 A1* | 4/2008 | Deml | B60N 2/501 297/344.12 |
| 2008/0164746 A1 | 7/2008 | Dozsa-Farkas | |
| 2008/0197684 A1 | 8/2008 | Ott et al. | |
| 2009/0134557 A1* | 5/2009 | Spangler | B60N 2/38 267/131 |
| 2009/0179390 A1* | 7/2009 | Wurmthaler | B60N 2/501 280/5.519 |
| 2009/0189407 A1* | 7/2009 | Lewis, II | B60N 2/24 296/65.02 |
| 2009/0198419 A1* | 8/2009 | Clark | B60N 2/501 701/49 |
| 2009/0205880 A1 | 8/2009 | Hammonds | |
| 2009/0272871 A1* | 11/2009 | Haller | B60N 2/501 248/631 |
| 2009/0284061 A1 | 11/2009 | Maier et al. | |
| 2010/0006364 A1 | 1/2010 | Koutsky et al. | |
| 2010/0072760 A1 | 3/2010 | Anderson et al. | |
| 2010/0117428 A1* | 5/2010 | Deml | B60N 2/502 297/344.15 |
| 2010/0133413 A1* | 6/2010 | Wahls | B60N 2/502 248/566 |
| 2010/0181708 A1* | 7/2010 | Kolb | B60G 17/0416 267/113 |
| 2010/0213345 A1 | 8/2010 | Haller | |
| 2010/0230989 A1 | 9/2010 | Cantor et al. | |
| 2010/0276211 A1 | 11/2010 | Kolb et al. | |
| 2010/0289312 A1 | 11/2010 | Burr et al. | |
| 2010/0294174 A1 | 11/2010 | Cummins et al. | |
| 2011/0001342 A1 | 1/2011 | Deml et al. | |
| 2011/0024958 A1* | 2/2011 | Deml | B60N 2/502 267/131 |
| 2011/0226930 A1 | 9/2011 | Enns et al. | |
| 2011/0233975 A1 | 9/2011 | Mindel et al. | |
| 2011/0278894 A1 | 11/2011 | Lorey | |
| 2011/0298266 A1* | 12/2011 | Haller | B60N 2/501 297/344.12 |
| 2012/0091773 A1 | 4/2012 | Lorey | |
| 2012/0187615 A1* | 7/2012 | Haller | B60N 2/527 267/140.13 |
| 2013/0158791 A1* | 6/2013 | Contratto | B60N 2/501 701/36 |
| 2014/0354027 A1* | 12/2014 | Kolb | B60N 2/52 297/452.1 |
| 2015/0184683 A1 | 7/2015 | Ogawa | |
| 2016/0001685 A1* | 1/2016 | Ulrich | B60N 2/502 248/550 |

FOREIGN PATENT DOCUMENTS

| | | |
|---|---|---|
| CN | 201621221 | 11/2010 |
| CN | 103863146 | 6/2014 |
| DE | 1480465 | 1/1970 |
| DE | 1405350 | 3/1970 |
| DE | 1480188 | 3/1970 |
| DE | 7419891 | 10/1974 |
| DE | 2537174 | 8/1975 |
| DE | 7731339 | 1/1978 |
| DE | 2816616 | 10/1979 |
| DE | 141769 | 5/1980 |
| DE | 3003175 | 8/1981 |
| DE | 3237167 | 4/1984 |
| DE | 3709900 | 2/1988 |
| DE | 3827255 | 2/1990 |
| DE | 3901898 | 7/1990 |
| DE | 3902743 | 7/1990 |
| DE | 4014466 | 11/1991 |
| DE | 19907658 | 2/1999 |
| DE | 19744199 | 4/1999 |
| DE | 19919697 | 11/2000 |
| DE | 19945841 | 4/2001 |
| DE | 10062999 | 7/2002 |
| DE | 10129127 | 1/2003 |
| DE | 10206223 | 9/2003 |
| DE | 10325320 | 12/2003 |
| DE | 10300876 | 7/2004 |
| DE | 102005028725 | 1/2005 |
| DE | 102005023088 | 6/2006 |
| DE | 60304643 | 4/2007 |
| DE | 102006030008 | 4/2007 |
| DE | 102008063812 | 4/2007 |
| DE | 112006002984 | 10/2008 |
| DE | 102007027320 | 1/2009 |
| DE | 102007056700 | 6/2009 |
| DE | 102008050192 | 3/2010 |
| DE | 102008052960 | 4/2010 |
| DE | 102008023120 | 6/2010 |
| DE | 102009022328 | 6/2010 |
| DE | 102009056874 | 7/2010 |
| DE | 102010051326 | 3/2012 |
| DE | 112012004573 | 8/2014 |
| DE | 102013106709 | 12/2014 |
| DE | 102014208320 | 11/2015 |
| EP | 0284365 | 9/1988 |
| EP | 1400398 | 3/2004 |
| EP | 1577156 | 9/2005 |
| EP | 1652724 | 5/2006 |
| EP | 2415632 | 2/2012 |
| GB | 1375931 | 12/1974 |
| GB | 1401881 | 8/1975 |
| GB | 1432614 | 4/1976 |
| GB | 1522795 | 8/1978 |
| GB | 1587637 | 4/1981 |
| GB | 2438090 | 11/2007 |
| WO | WO 92/04224 | 3/1992 |
| WO | WO 92/09451 | 6/1992 |
| WO | WO 98/32627 | 7/1998 |
| WO | WO 02/26402 | 4/2002 |

(56) References Cited

FOREIGN PATENT DOCUMENTS

| WO | WO 03/063650 | 8/2003 |
|----|--------------|--------|
| WO | WO 2007/058572 | 5/2007 |
| WO | WO 2009/024212 | 2/2009 |

* cited by examiner

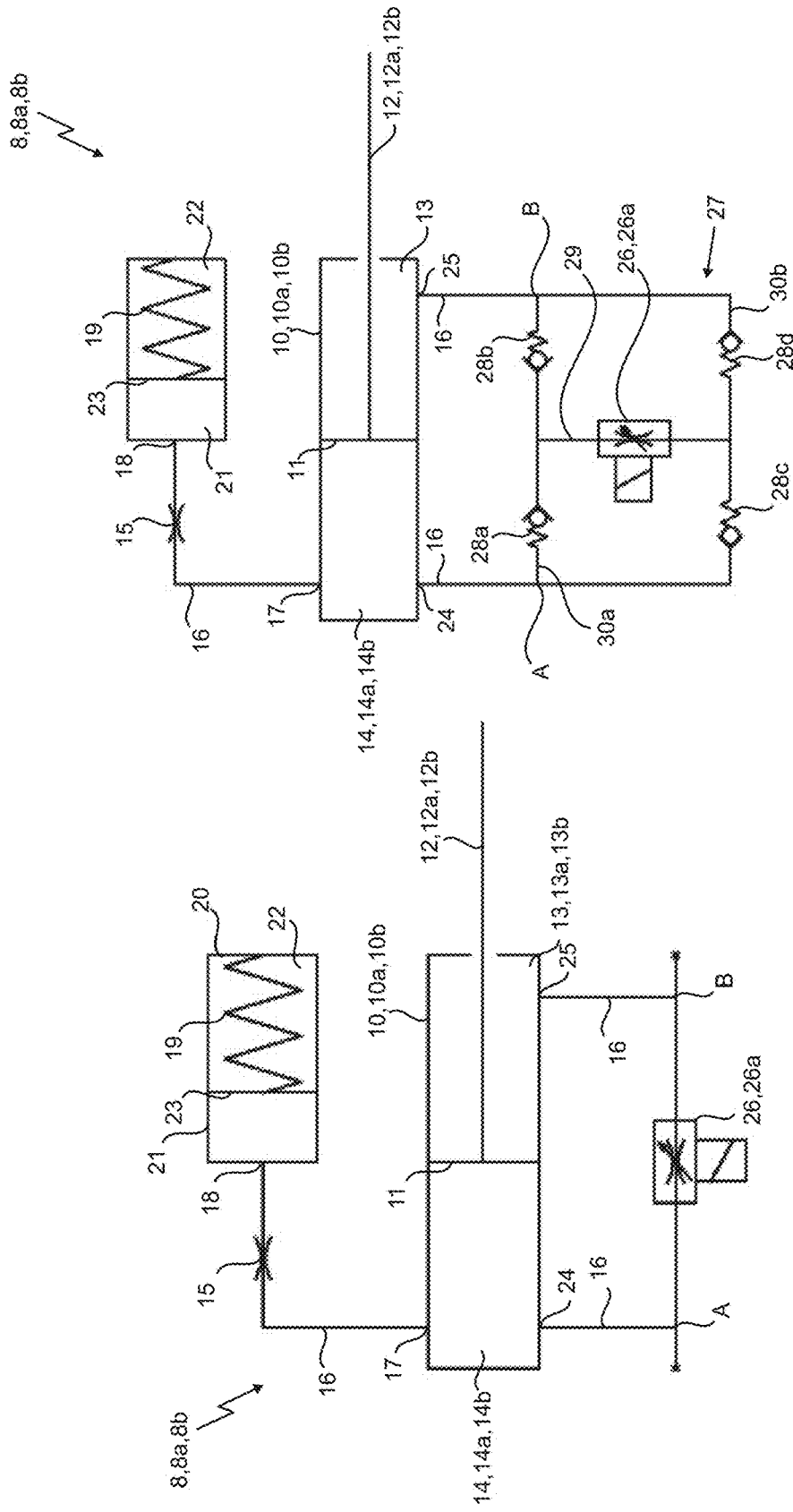

HORIZONTAL VIBRATION DEVICE FOR A VEHICLE SEAT

CROSS-REFERENCE TO RELATED APPLICATIONS

This application claims the benefit of German Patent Application No. 10 2015 113 176.5 filed Aug. 10, 2015.

FIELD

The invention relates to a horizontal vibration device for a vehicle seat, comprising a damper module which damps horizontal vibrations between an upper part on the seat side and a lower part on the body-side in the longitudinal direction (X) of the vehicle and/or in the width direction (Y) of the vehicle, and comprising a regulating/control module for regulating and/or controlling the damper module, said damper module being arranged in an interspace between the seat-side upper part and the body-side lower part.

BACKGROUND

It is particularly desirable in the case of utility vehicles, such as tractors, construction machines, stacking trucks and HGVs to have, in addition to a vertical suspension or damping of vertical vibrations respectively, a damping of horizontal vibrations. Vehicles of this type are often driven on uneven ground and frequently have to negotiate steep upward slopes and downward slopes respectively. In this respect, the people in the vehicles are subjected to high impacts and changes in position and direction. To allow an optimum sitting comfort, this should be compensated as effectively as possible both in the vertical direction and in the horizontal direction by a vehicle seat. Unevenness, such as potholes for example, on a flat carriageway also causes this type of impact. When travelling for a relatively long period of time, this can have a tiring effect on the driver of, for example an HGV, or can even cause him/her pain. Vibrations and impacts transversely to the direction of travel can be damped by a transverse or lateral horizontal suspension respectively to protect the back from an unhealthy jarring action, while vibrations which occur when travelling fast or on very hilly ground can be minimised by a longitudinal horizontal suspension.

Horizontal vibration devices are already known from the prior art. However, the used damper systems which are installed between a seat-side upper part and a body-side lower part, usually take up too much space. In particular, the height of a vehicle seat substructure should not be configured to be too great. Furthermore, it is often desirable to configure the damping characteristics of the horizontal vibration device such that they are actively or respectively semi-actively controllable. This usually requires a control/regulating system which requires additional installation space. In most cases, this has a complicated construction and accordingly entails cost-intensive solutions.

SUMMARY

The present disclosure is directed to providing a horizontal vibration device which requires a relatively small installation space. The present disclosure further provides a vehicle seat having a horizontal vibration device of this type.

More particularly, the present disclosure provides a horizontal vibration device for a vehicle seat, comprising a damper module which damps horizontal vibrations between a seat-side upper part and a body-side lower part in the longitudinal direction (X) of the vehicle and/or in the width direction (Y) of the vehicle, and comprising a regulating/control module for regulating and/or controlling the damper module, said damper module being arranged in an interspace between the seat-side upper part and the body-side lower part. The horizontal vibration device is further characterized in that the damper module comprises at least one hydraulic vibration damper, said at least one hydraulic vibration damper being fluidically connected to a volume equalising module.

A horizontal vibration device of this type significantly reduces the required installation space. On the one hand, the horizontal vibration device according to the invention has a modular construction. Consequently, although the damper module is arranged in the interspace between the seat-side upper part and the body-side lower part, the regulating/control module for regulating and/or controlling the damper module can be arranged outside the interspace. Furthermore, when the hydraulic vibration damper moves in, the hydraulic fluid, displaced thereby out of the vibration damper is delivered to the volume equalising module. The vibration damper can thus be of a small construction. The volume equalising module can also be advantageously arranged outside the interspace. Thus, the interspace between the seat-side upper part and the body-side lower part can have the smallest possible dimensions. Furthermore, the damper module can be regulated or controlled respectively by a regulating/control module. A control is generally understood as meaning that an output variable is produced based on an input signal. An input signal of this type is generally a binary variable, for example On/Off. An example of an output variable would then be, for example, an open or closed position respectively of a valve. A regulation is based on feedback from an output signal. In a regulation, the control variable is continuously compared with a set point. The controller determines an actuating variable, according to the difference of the values, which actuating variable acts on the control variable so that it minimises the difference and the control variable assumes a desired time behaviour, in spite of disturbance variables which are present.

The at least one hydraulic vibration damper is preferably a monotube damper. The monotube damper comprises a double-acting hydraulic cylinder, which is divided by a piston having a piston rod into an annular chamber and a piston chamber. An annular chamber is understood as meaning the working chamber of the cylinder in which the piston rod is located. The piston chamber is then the working chamber, remote from the piston rod, of the cylinder. A double-acting hydraulic cylinder has two opposite piston surfaces which can be acted upon with the hydraulic fluid. The piston rod can thus be loaded in the forward and return stroke, as a result of which the cylinder has two active directions of movement. Preferably arranged in the piston and/or between at least one hydraulic vibration damper and the volume equalising module is a damping valve by means of which a flow resistance can be fixed. Damping characteristics of the damper are determined by the flow resistance. It would be conceivable to configure this damping valve such that it is controllable, as a result of which it would be possible to control the flow resistance and thus the damping characteristics.

Alternatively, it would be conceivable for the hydraulic vibration damper to be a twin-tube damper. Twin-tube dampers have an inner tube in which a piston is movably arranged. This inner tube is surrounded by a housing or outer tube, to which the hydraulic fluid, displaced from the inner tube, is delivered. The outer tube is advantageously fluidically connected to the volume equalising module so that just one portion of the displaced hydraulic fluid is located in the outer tube and a further portion is delivered to the volume equalising module. Accordingly, a twin-tube damper can also be configured such that it occupies a relatively small installation space.

According to a preferred aspect of the invention, the volume equalising module is fluidically connected to the piston chamber of the at least one hydraulic vibration damper. Preferably, in this respect, the fluid displaced in the compression stage of the at least one hydraulic vibration damper can be delivered to the volume equalising module, and in the rebound stage of the at least one hydraulic vibration damper, hydraulic fluid can be delivered from the volume equalising module to the at least one hydraulic vibration damper. In this respect, the at least one hydraulic vibration damper is preferably fluidically connected to the piston chamber by a pressure line. The pressure line is preferably connected to a first connection element of the piston chamber and to a connection element of the volume equalising module. More preferably, a damping valve is arranged in the pressure line between the piston chamber of the hydraulic vibration damper and the volume equalising module.

According to a preferred embodiment of the invention, the hydraulic fluid, displaced in the compression stage of the at least one hydraulic vibration damper can be delivered to the volume equalising module, as a result of which a pretensioning element in the volume equalising module can be compressed. In the rebound stage of the hydraulic vibration damper, the hydraulic fluid which is driven by the now expanding pretensioning element can preferably be delivered to the hydraulic vibration damper from the volume equalising module. A pretensioning element of this type can be a compressible gas, a spring, an elastomer or an element which can be compressed in another way.

The volume equalising module preferably comprises a cylinder having a first and a second chamber. The first and the second chamber are preferably divided by a piston arranged such that it can move in the cylinder. The hydraulic fluid delivered to the volume equalising module can in this respect be delivered to the first chamber. Since the hydraulic fluid now occupies a greater volume in the first chamber, the piston is moved in the direction of the second chamber. The pretensioning element which is arranged in the second chamber is compressible thereby.

The regulating/control module is preferably arranged outside the interspace between the seat-side upper part and the body-side lower part. The regulating/control module is preferably fluidically connected to the annular chamber and to the piston chamber. The regulating/control module is more preferably connected by pressure lines to a second connection element of the piston chamber and to a connection element of the annular chamber. According thereto, the interspace can be configured in a particularly space-saving manner, because although the damper module and the corresponding connection lines or pressure lines respectively are arranged in the interspace, the regulating/control module and the volume compensating module do not have to be arranged in the interspace.

According to a further preferred aspect of the invention, the regulating/control module comprises a valve arrangement, in particular a proportional flow control valve which is operatively connected to the hydraulic vibration damper. The valve arrangement is preferably fluidically interconnected to the hydraulic vibration damper such that the power of the compression stage and/or of the rebound stage can be modulated by this valve arrangement. The valve arrangement can preferably be controlled by a control/evaluation means. The power or the damping power respectively of the hydraulic vibration damper is provided by the flow resistance of the damping valve. As already stated, a damping valve of this type can be arranged in the piston of the hydraulic vibration damper and/or in the pressure line between the hydraulic vibration damper and the volume compensating module. A preferred bypass line between the annular chamber and the piston chamber influences the flow resistance in the damping valve and thus influences the damping power. The valve arrangement is preferably arranged in the bypass line. The flow in the bypass line is thus controlled by the valve arrangement, as a result of which the flow resistance in the damping valve can, in turn, be controlled by the valve arrangement. In a particularly preferred manner, the valve arrangement is configured as a proportional flow control valve which can be controlled by the control/evaluation means, as a result of which a semi-active damping control is possible. However, it is also conceivable for the valve arrangement to be an actuatable throttle valve which can be actuated manually, for example. A passive damping control would be possible thereby.

According to a further preferred embodiment, the regulating/control module comprises a hydraulic rectifier circuit which is configured as a full bridge, consisting of four non-return valves which are operatively connected to the hydraulic vibration damper. A valve arrangement, in particular a proportional flow control valve, is preferably arranged in the diagonal bridge. The valve arrangement is more preferably fluidically interconnected to the hydraulic vibration damper such that the power of the compression stage and/or of the rebound stage can be modulated by means of this valve arrangement. Furthermore, it would be conceivable for the valve arrangement to be controllable by a control/evaluation means. Two non-return valves connected in series are advantageously arranged in a respective branch of the bridge, being oriented in an opposed manner in respect of the throughflow. The diagonally opposite non-return valves are preferably oriented identically in respect of the throughflow. A rectifier circuit of this type is also known as a hydraulic H circuit or a hydraulic Graetz circuit. The flow resistance in the damping valve can in turn be influenced or controlled respectively by the valve arrangement in the diagonal bridge. A valve arrangement of this type is preferably a proportional flow control valve. In a simple arrangement of the valve arrangement or of the proportional flow control valve respectively between the annular chamber and the piston chamber, it is often necessary to adapt the flow of fluid with respect to the flow direction. Many conventional valves have a differing flow throughput subject to the direction of flow. During control of the hydraulic vibration damper in the rebound and compression stages, the fluid flows through the valve arrangement in different directions in the compression and rebound stages. Thus, it is necessary to compensate the different flow throughput. A rectifier circuit has the advantage that the hydraulic fluid always flows through the valve arrangement in the same direction in the diagonal bridge, as a result of which it is unnecessary to compensate the flow throughput.

According to a further advantageous aspect of the invention, the regulating/control module comprises a hydraulic fluid conveying means which is operatively connected to the hydraulic vibration damper. The hydraulic fluid conveying means is preferably fluidically interconnected to the at least one hydraulic vibration damper such that the power of the compression stage and/or of the rebound stage can be modulated by means of the hydraulic fluid conveying means. The hydraulic fluid conveying means advantageously has a controllable bidirectional pump and a motor for the pump. More preferably, the hydraulic fluid conveying means can be controlled by a control/evaluation means.

Both the hydraulic fluid conveying means and a valve arrangement and/or a hydraulic rectifier circuit, configured as a full bridge, are preferably operatively connected to the at least one hydraulic vibration damper. The hydraulic fluid conveying means is preferably connected parallel to the valve arrangement or to the hydraulic rectifier circuit respectively. As already stated, a rectifier circuit of this type preferably has four non-return valves and a valve arrangement in the diagonal bridge. The hydraulic fluid conveying means, the valve arrangement and/or the rectifier circuit are preferably fluidically interconnected to the hydraulic vibration damper such that the power of the compression stage and/or of the rebound stage can be modulated thereby in combination. More preferably, both the valve arrangement and the hydraulic fluid conveying means can be controlled by a control/evaluation means.

It would also be conceivable to operate the hydraulic fluid conveying means combined with a throttle valve. The damping of rebound and compression stages of the at least one hydraulic vibration damper can be synchronously adjusted by a throttle valve of this type. Damping can thus be passively (pre-)adjusted, while an active damping control is made possible by the hydraulic fluid conveying means. Alternatively, the hydraulic fluid conveying means could be operated combined with two throttle non-return valves which are connected in an anti-parallel manner and by which the rebound and compression stages can be adjusted separately. Here, the damping can thus be passively (pre-)adjusted, while an active damping control is made possible by the hydraulic fluid conveying means.

According to a further preferred embodiment, the horizontal vibration device comprises at least one sensor means. The sensor means preferably has a position sensor which can measure the position of the seat-side upper part relative to the body-side lower part in at least one spatial direction (X, Y, Z). In a further preferred manner, the sensor means has a speed sensor which can measure the speed of the seat-side upper part relative to the body-side lower part in at least one spatial direction (X, Y, Z). The sensor means advantageously has an acceleration sensor by means of which the acceleration of the seat-side upper part relative to the body-side lower part in at least one spatial direction (X, Y, Z) can be measured. The regulating/control module preferably comprises a control/evaluation means by means of which the data of the sensor means can be evaluated and the valve arrangement and/or the hydraulic fluid conveying means can be controlled.

The horizontal vibration device can be operated in different ways. First of all, it would be conceivable to operate the horizontal vibration device in an active, semi-active or passive manner. In a preferred embodiment, during active damping, hydraulic fluid can be delivered to and respectively removed from a working chamber (piston chamber, annular chamber) of the hydraulic vibration damper by the hydraulic fluid conveying means based on the data determined by the sensor device. Thus, a force can be actively exerted on the piston or on the piston rod respectively. In a semi-active control, in a preferred embodiment, a proportional flow control valve is connected in a bypass line between the piston chamber and the annular chamber. Thus, the damping power or the flow respectively in the bypass line can be controlled on the basis of the data determined by the sensor means. For active or semi-active control respectively, it is necessary for particular data to be measured by the sensor means. In this respect, the relative position of the movable seat-side upper part relative to the stationary body-side lower part is preferably determined. The position and speed values of the modules which are movable relative to each another advantageously produce a product which is required for the control algorithm of the semi-actively or actively controlled system.

A passive damping cannot be configured to be adjustable. The characteristics of the damper or of the damping respectively are defined in a fixed manner, so that the flow resistance of the hydraulic fluid is fixed by the valve arrangements used in the damper. The quantity of hydraulic fluid exchanged (between volume equalising module and piston chamber) during a defined working stroke is always the same. The flow resistance depends solely on the speed of the piston inside the hydraulic cylinder. However, embodiments with an adjustable passive damping are also conceivable. In this respect, the quantity of hydraulic fluid in the rebound stage/compression stage can be modulated synchronously or asynchronously by a manually actuatable valve arrangement. The valve arrangement is in this respect preferably connected between the annular chamber and the piston chamber. In a synchronous modulation, the quantity, exchanged between the working chambers, in the rebound stage and compression stage can be adjusted by a valve arrangement. In an asynchronous modulation, the exchanged quantity of hydraulic fluid in the rebound stage and in the compression stage can be adjusted separately.

According to a further advantageous aspect of the invention, the sensor means comprises a basic body and a measuring arm which is arranged rotatably on the basic body. Preferably, the basic body is arranged on the seat-side upper part and the measuring arm is arranged on the body-side lower part. However, it would also be conceivable for the basic body to be arranged on the body-side lower part and for the measuring arm to be arranged on the seat-side upper part. The sensor means advantageously determines data such as position, speed and acceleration from the change in an angle of rotation of the measuring arm.

According to a further preferred embodiment, the damper module comprises a first and a second hydraulic vibration damper. The first and the second hydraulic vibration dampers are preferably arranged in the longitudinal direction (X) of the vehicle and/or in the width direction (Y) of the vehicle. The annular chamber of the first hydraulic vibration damper is advantageously fluidically connected to the annular chamber of the second hydraulic vibration damper. Furthermore, it is preferred that the piston chamber of the first hydraulic vibration damper is connected to the piston chamber of the second hydraulic vibration damper and to the volume equalising module.

Preferably arranged in the interspace between the seat-side upper part and the body-side lower part is a guide system, by which the seat-side upper part is displaceably mounted on the body-side lower part. A guide system of this type could be a rail system, for example.

BRIEF DESCRIPTION OF THE DRAWINGS

Further advantages, objectives and characteristics of the present invention are described on the basis of the following description of the accompanying figures. In the different embodiments, similar components can have the same reference signs.

FIG. 3 is a schematic circuit diagram of a hydraulic vibration damper according to one embodiment;

FIG. 4 is a schematic circuit diagram of a hydraulic vibration damper according to a further embodiment;

DETAILED DESCRIPTION

Figure 1:
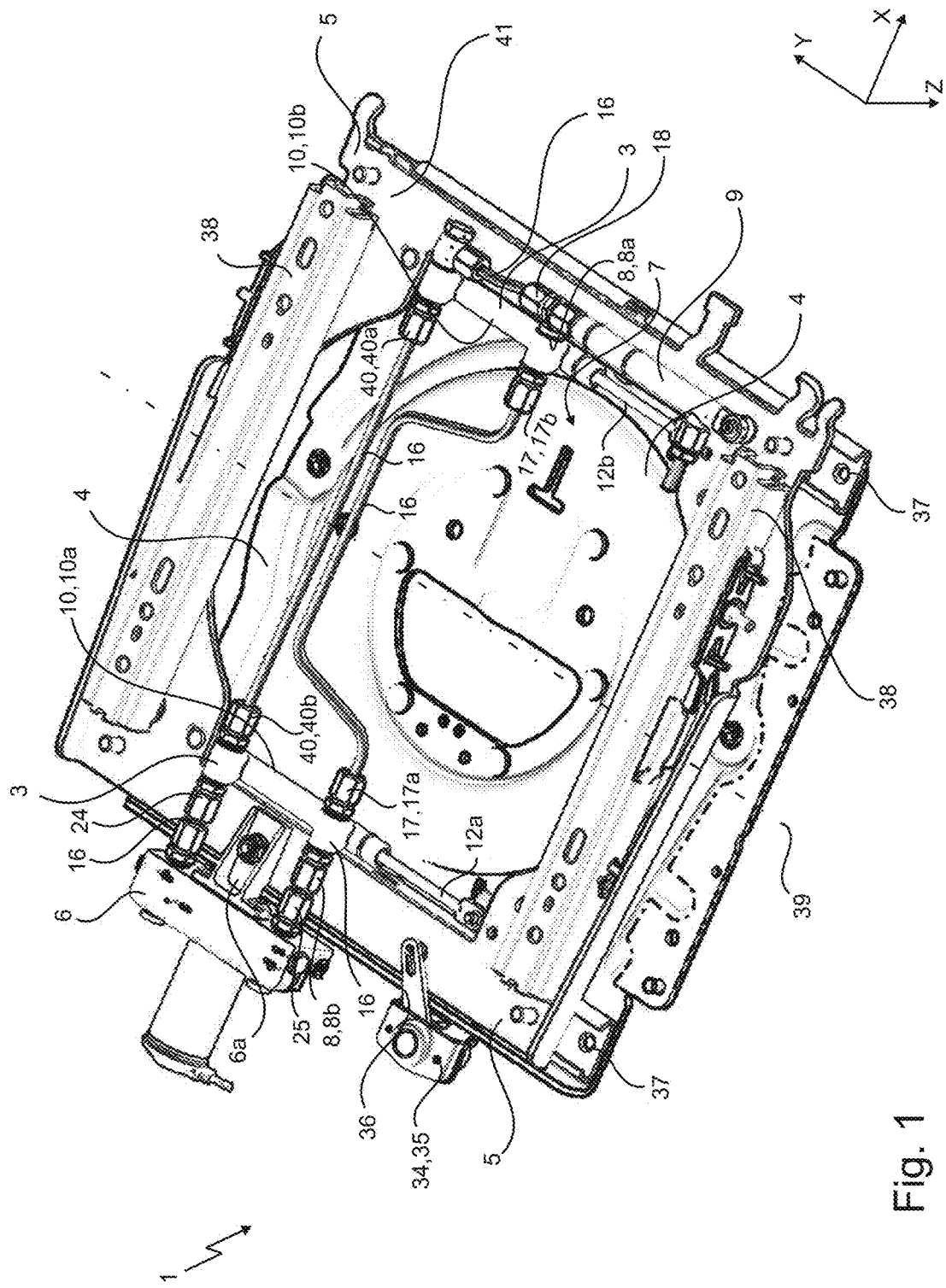
FIG. 1 is a view of a horizontal vibration device having a seat-side upper part and a body-side lower part.

FIG. 1 shows a horizontal vibration device (1) for a vehicle seat (2). In this respect, the modularly constructed horizontal vibration device (1), the seat-side upper part (4) and the body-side lower part (5) are shown. The seat-side upper part (4) and the body-side lower part (5) extend in the longitudinal direction (X) of the vehicle and in the width direction (Y) of the vehicle. The horizontal vibration device (1) comprises a damper module (3) which damps horizontal vibrations between a seat-side upper part (4) and a body-side lower part (5) in the longitudinal direction (X) of the vehicle and/or in the width direction (Y) of the vehicle. In this embodiment, the horizontal vibration device (1) is configured to damp vibrations in the width direction (Y) of the vehicle. An alternative configuration of vibration damping in the longitudinal direction (X) of the vehicle or a combination of damping modules (3) for damping vibrations both in the vehicle longitudinal direction (X) and in the vehicle width direction (Y) would also be conceivable.

The seat-side upper part (4) is arranged in a height direction (Z) above the body-side lower part (5). In this respect, arranged in the interspace (7) between the seat-side upper part (4) and the body-side lower part (5) is a guide system (37) by which the seat-side upper part (4) is mounted displaceably on the body-side lower part (5). In this embodiment, the guide system consists of a rail system having a C profile rail in which a sliding rail is displaceably mounted. However, it would also be conceivable to use plastics sliding elements or ball bearings for the mounting. The horizontal vibration device (1) damps horizontal vibrations in the vehicle width direction (Y). Consequently, a respective rail system is arranged in the vehicle longitudinal direction (X) in a respectively outer peripheral region, said rail system being arranged symmetrically to a centre axis (39).

Arranged on the body-side lower part (5), on the underside (41) thereof are two fastening rails (37) by means of which said body-side lower part can be fastened to the further seat substructure. This underside (41) is the side which, in the height direction (Z), is opposite the side of the body-side lower part (5) which faces the seat-side upper part (4). These fastening rails (37) extend along the vehicle longitudinal direction (X) and are arranged in a respective outer peripheral region in the vehicle width direction (Y).

The damper module (3) is arranged in the interspace (7) between the seat-side upper part (4) and the body-side lower part (5). According to the invention, the damper module (3) comprises at least one hydraulic vibration damper (8, 8a, 8b), the at least one hydraulic vibration damper (8, 8a, 8b) being fluidically connected to a volume equalising module (9). In this embodiment, the damper module (3) comprises a first (8a) and a second hydraulic vibration damper (8b). The hydraulic vibration dampers (8, 8a, 8b) are configured as monotube dampers. These monotube dampers comprise a double-acting hydraulic cylinder (10, 10a, 10b) which is divided by a piston (11) having a piston rod (12, 12a, 12b) into an annular chamber (13, 13a, 13b) and a piston chamber (14, 14a, 14b). FIGS. 3 to 8 are schematic diagrams which show a monotube damper of this type with a corresponding wiring.

The respective hydraulic cylinders (10) are arranged between the seat-side upper part (4) and the body-side lower part (5) such that a respective longitudinal axis of a hydraulic cylinder (10, 10a, 10b) and the respective piston rod is oriented in the damping direction. In this embodiment, the damping direction is the width direction (Y) of the vehicle and it also corresponds to the direction in which the guide system (37) or the rail system respectively allows a displacement of the seat-side upper part (4). The two hydraulic vibration dampers (8, 8a, 8b), like the two rail systems, are arranged in an outer region in the vehicle longitudinal direction (X). They are also arranged symmetrically to the centre axis (39). Furthermore, they are arranged in the vehicle longitudinal direction (X) closer to the centre axis (39) than the respective rail system. In this respect, the seat-side upper part (4) is connected to the piston rods (12, 12a, 12b) of the two hydraulic vibration dampers (8, 8a, 8b). The body-side lower part (5) is connected to the hydraulic cylinders (10, 10a, 10b) of the two hydraulic vibration dampers (8, 8a, 8b). The arrangement of the rail systems which is symmetrical to the centre axis (39) and of the two hydraulic vibration dampers (8, 8a, 8b) ensures an introduction of force which is distributed uniformly over the two hydraulic vibration dampers (8, 8a, 8b).

The piston (11) arranged in the hydraulic cylinder (10, 10a, 10b) divides the hydraulic cylinder (10, 10a, 10b) into an annular chamber (13, 13a, 13b) and a piston chamber (14, 14a, 14b). The annular chamber (13a) of the first hydraulic vibration damper (8a) is fluidically connected to the annular chamber (13b) of the second hydraulic vibration damper (8b). Likewise, the piston chamber (14a) of the first hydraulic vibration damper (8a) is fluidically connected to the piston chamber (14b) of the second hydraulic vibration damper (8b) and also to the volume equalising module (9). The respective fluidic connection is realised by pressure lines (16), one pressure line (16) being respectively connected to a first connection element (17, 17a, 17b) of the piston chamber (14, 14a, 14b), a further pressure line being connected to a first connection element (17, 17a, 17b) of the piston chamber (14, 14a, 14b) and to a connection element (18) of the volume equalising module (9) and a further pressure line (16) being connected to a respective connection element (40, 40a, 40b) of the annular chamber (13, 13a, 13b). An introduction of force which is distributed uniformly over the two hydraulic vibration dampers (8, 8a, 8b) is ensured by a connection of this type of annular and piston chambers combined with the symmetrical arrangement of the hydraulic vibration dampers (8, 8a, 8b) which has already been described.

The horizontal vibration device (1) further comprises a regulating/control module (6) for regulating and/or controlling the damper module (3). This regulating/control module (6) is arranged outside the interspace (7) between the seat-side upper part (4) and the body-side lower part (5), as a result of which the horizontal vibration device (1) is constructed in a compact and space-saving manner. The regulating/control module (6) is fastened by a fastening device (6a) to an underside (41) of the body-side lower part (5) in an outer region in the vehicle longitudinal direction (X). Accordingly, the regulating/control module (6) projects laterally over the body-side lower part (5) and the seat-side upper part (4) respectively in the vehicle longitudinal direction (X). The volume equalising module (9) is arranged on the underside (41) of the body-side lower part (5) on the side opposite the vehicle longitudinal direction (X).

Figure 2:
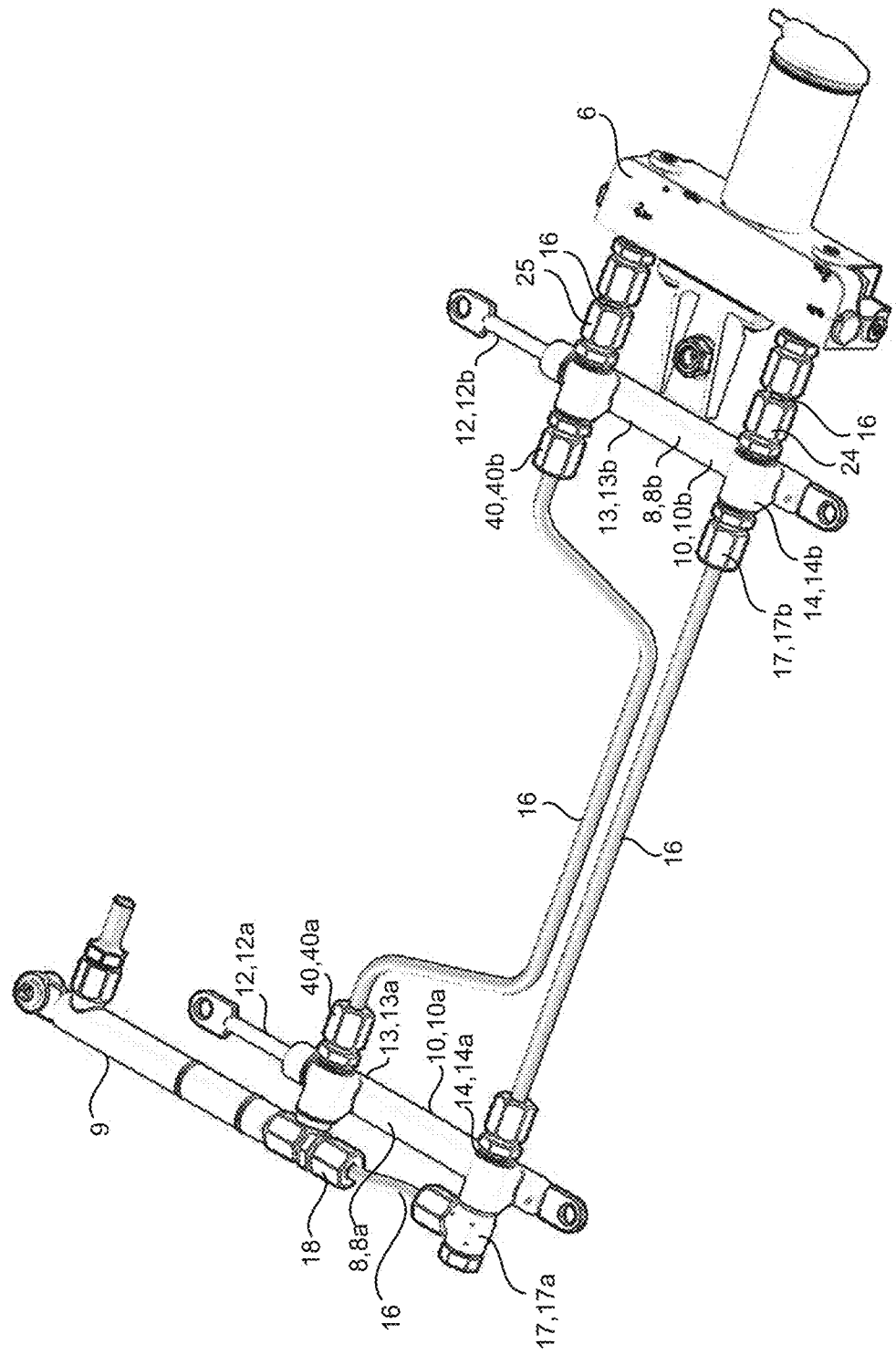
FIG. 2 is a view of a horizontal vibration device.

Furthermore, the regulating/control module (6) is fluidically connected to the annular chamber (13, 13a, 13b) and to the piston chamber (14, 14a, 14b) of the two hydraulic vibration dampers (8, 8a, 8b). In this respect, the regulating/control module (6) is connected by pressure lines (16) to a second connection element (24) of the piston chamber (14) and to a second connection element (25) of the annular chamber (13, 13a) of the first hydraulic vibration damper (8, 8a). Due to the uniformly distributed introduction of force which has already been described and to the fluidic connection of the annular chambers (13, 13a, 13b) and piston chambers (14, 14a, 14b) by the pressure lines (16) into the two hydraulic vibration dampers (8, 8a, 8b), a modulation of the damper characteristics by the regulating/control module (6), for example by a bypass line having a controllable valve, acts uniformly on the two hydraulic vibration dampers (8, 8a, 8b). FIG. 2 only shows the damper module (3) and the regulating/control module (6) without the seat-side upper part (4) and the body-side lower part (5).

The horizontal vibration device (1) further comprises a sensor means (34). The sensor means (34) has a position sensor by means of which the position of the seat-side upper part (4) relative to the body-side lower part (5) in at least one spatial direction (X, Y, Z) can be measured, a speed sensor by means of which the speed of the seat-side upper part (4) relative to the body-side lower part (5) in at least one spatial direction (X, Y, Z) can be measured and an acceleration sensor by means of which the acceleration of the seat-side upper part (4) relative to the body-side lower part (5) in at least one spatial direction (X, Y, Z) can be measured. These data from the sensor means (34) can be evaluated by a control/evaluation means in the regulating/control module (6). Using this data, an active or semi-active control of the damping is possible, for example by a valve arrangement (26) and/or by the hydraulic fluid conveying means (31).

Figure 9:
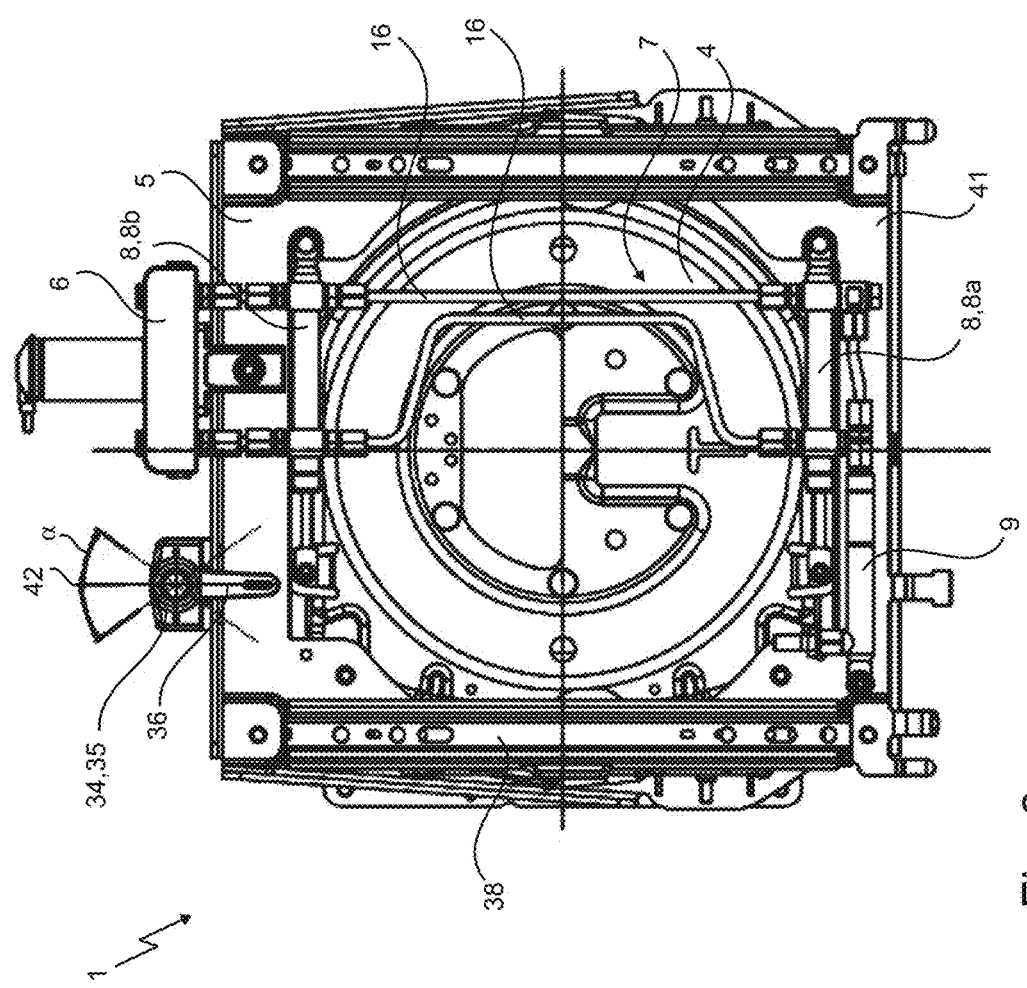
FIG. 9 is a plan view of a horizontal vibration device having a seat-side upper part and a body-side lower part.
Figure 9A:
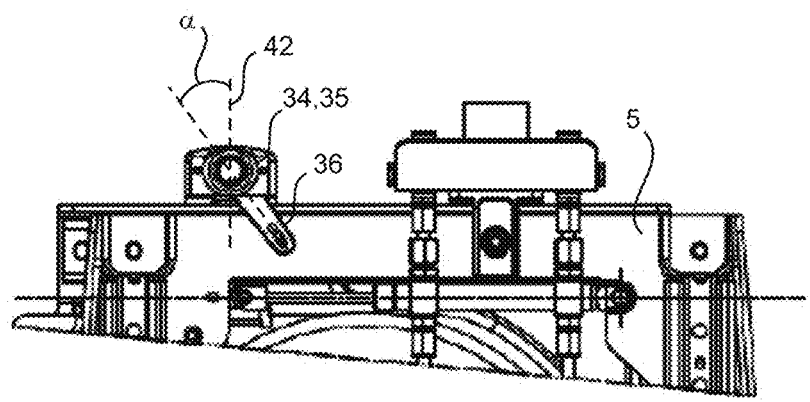
FIG. 9a, b, c are plan views of a sensor device where the seat-side upper part is moved out in different positions, and with a body-side lower part.
Figure 9B:
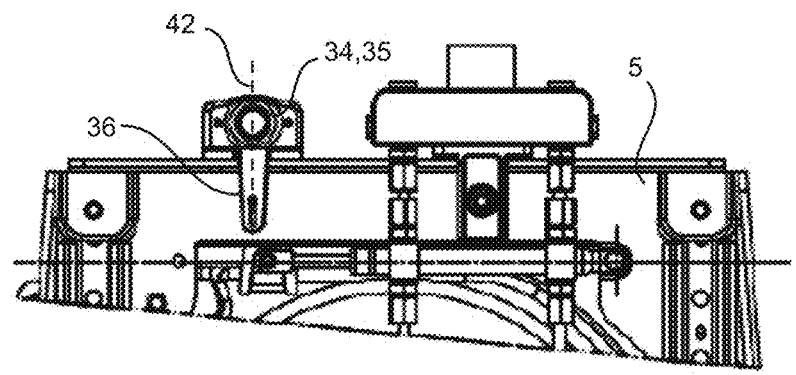
Figure 9C:
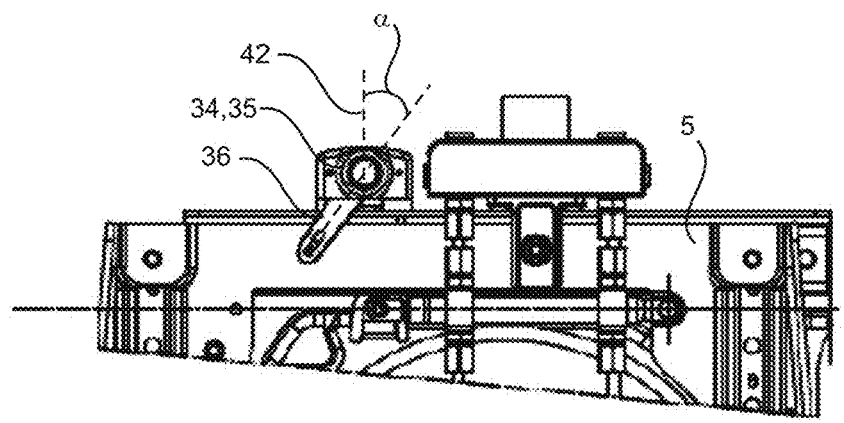

The sensor means (34) comprises a basic body (35) and a measuring arm (36) which is arranged rotatably on the basic body (35). The basic body (35) is in this respect arranged on the seat-side upper part (4) and the measuring arm (36) is arranged on the body-side lower part (5) or on the underside (41) of the body-side lower part (5) respectively. In this respect, the basic body (35), like the regulating/control module (6), projects over the body-side lower part (5) and the seat-side upper part (4) respectively in the vehicle longitudinal direction (X). During a displacement of the seat-side upper part (4) relative to the body-side lower part (5), the measuring arm rotates relative to the basic body. This can be seen in FIGS. 9, 9a, 9b and 9c, FIG. 9 being a plan view of the underside (41) of the body-side lower part (5) and FIGS. 9a, 9b and 9c showing details of the plan view including the sensor means (34) respectively. If the seat-side upper part (4) is not deflected with respect to the body-side lower part (5), the measuring arm is in a middle position (42). This is shown in FIG. 9b. If the seat-side upper part (4) is displaced relative to the body-side lower part (5), the measuring arm (36) rotates about an angle of rotation ($\alpha$). This can be seen in FIGS. 9a and 9b. From the change in angle, the sensor means (34) determines the relative position, the speed and the acceleration of the movable seat-side upper part (4) with respect to the stationary body-side lower part (5). The position and speed values of the assemblies moving relative to one another produce a product required for the control algorithm of the semi-actively or respectively actively controlled system.

FIGS. 3 to 8 show schematic diagrams of a hydraulic vibration damper (8, 8a, 8b) which is fluidically connected to a volume equalising module (9). Different embodiments are also shown in which the damping characteristics are shown by different circuits of the hydraulic vibration damper (8, 8a, 8b) with the volume equalising module (9) and a regulating/control module (6) by means of which the damper module (3) can be controlled. As already mentioned, a wiring of this type acts on two, or also on several hydraulic vibration dampers (8, 8a, 8b), due to the uniform force distribution as a result of the symmetrical arrangement and due to the fluidic connection by pressure lines of the annular chambers (13, 13a, 13b) and piston chambers (14, 14a, 14b). The embodiments in these figures differ only in the wiring of the vibration damper (8, 8a, 8b) by the regulating/control module (6).

A hydraulic vibration damper (8, 8a, 8b) is shown which is configured as a monotube damper. The monotube damper comprises a double-acting hydraulic cylinder (10, 10a, 10b) which is divided by a piston (11) having a piston rod (12) into an annular chamber (13, 13a, 13b) and a piston chamber (14, 14a, 14b). The piston chamber (14, 14a, 14b) is fluidically connected to the volume equalising module (9). The hydraulic fluid displaced in the compression stage of the hydraulic vibration damper (8, 8a, 8b) can thus be delivered to the volume equalising module (9). In the rebound stage of the hydraulic vibration damper (8, 8a, 8b), the hydraulic fluid can be delivered to the hydraulic vibration damper (8, 8a, 8b) from the volume equalising module (9). As already stated, the volume equalising module (9) is fluidically connected to the piston chamber (14, 14a, 14b) by a pressure line (16), the pressure line (16) being connected to a first connection element (17, 17a, 17b) of the piston chamber (14, 14a, 14b) and to a connection element (18) of the volume equalising module (9). Furthermore, arranged between the hydraulic vibration damper (8, 8a, 8b) and the volume equalising module (9) is a damping valve (15) by means of which the flow resistance in the pressure line (16) can be fixed and thus the damping is preset.

The volume equalising module (9) comprises a cylinder (20) with a first chamber (21) and a second chamber (22). This first chamber (21) and second chamber (22) are divided by a piston (23) which is arranged such that it can move in the cylinder (20). The hydraulic fluid displaced in the compression stage of the at least one hydraulic vibration damper (8, 8a, 8b) is delivered to the volume equalising module (9) or to the first chamber (21) respectively. Consequently, due to the expanding volume in the first chamber (21), the piston (23) moves in the direction of the second chamber (22). Arranged in the second chamber (22) is a pretensioning element (19) which is compressed by this movement. In the figures, the pretensioning element (19) is shown as a spring in principle. However, it could be configured as a compressible gas or as a medium which can be compressed in another way. In the rebound stage of the hydraulic vibration damper (8, 8*a*, 8*b*), the hydraulic fluid which is driven by the now expanding pretensioning element (19) can then be delivered to the hydraulic vibration damper (8, 8*a*, 8*b*) from the volume equalising module (9).

FIG. 3 shows an embodiment in which the regulating/control module (6) comprises a valve arrangement (26) which is operatively connected to the at least one hydraulic vibration damper (8, 8*a*, 8*b*). The valve arrangement (26) is connected to the annular chamber (13, 13*a*, 13*b*) and to the piston chamber (14, 14*a*, 14*b*) by a bypass line or a pressure line (16) respectively and is thus fluidically interconnected to the at least one hydraulic vibration damper (8, 8*a*, 8*b*) such that the power of the compression stage and/or of the rebound stage can be modulated by means of this valve arrangement (26). In this embodiment, the valve arrangement (26) is configured as a proportional flow control valve (26*a*). Thus, in the compression stage, hydraulic fluid flows out of the piston chamber (14, 14*a*, 14*b*) via conduction point A, the valve arrangement (26) and conduction point B to the annular chamber (13, 13*a*, 13*b*). In the rebound stage, the hydraulic fluid flows in the opposite direction. The flow is controlled by the valve arrangement (26), said valve arrangement (26) being controllable by a control/evaluation means. Consequently, the flow resistance in the damping valve (15) and thus the damping characteristics of the hydraulic vibration damper (8, 8*a*, 8*b*) can be controlled. A semi-active control of the damping is possible due to the wiring with the valve arrangement (26).

FIG. 4 shows an embodiment in which the regulating/control module (6) comprises a hydraulic rectifier circuit (27), configured as a full bridge and consisting of four non-return valves (28*a*, 28*b*, 28*c*, 28*d*), which is operatively connected to the at least one hydraulic vibration damper (8, 8*a*, 8*b*). The hydraulic rectifier circuit (27) is connected to the annular chamber (13, 13*a*, 13*b*) and to the piston chamber (14, 14*a*, 14*b*) by a bypass line or a pressure line (16) respectively. A valve arrangement (26) is disposed in the bridge diagonal (29), the valve arrangement (26) being fluidically interconnected to the at least one hydraulic vibration damper (8, 8*a*, 8*b*) such that the power of the compression stage and/or of the rebound stage can be modulated by means of this valve arrangement (26). In this case, the valve arrangement (26) is configured as a proportional flow control valve (26*a*) and can be controlled by a control/evaluation means. Two serially connected non-return valves (28*a*, 28*b*, 28*c*, 28*d*) are arranged in each bridge branch (30*a*, 30*b*), in an opposed orientation in respect of the throughflow. Furthermore, two diagonally opposite non-return valves (28*a*, 28*b*, 28*c*, 28*d*) are each arranged in the same orientation with respect to the throughflow. In the embodiment described in FIG. 3, the hydraulic fluid flows in the rebound or compression stage respectively in opposite directions through the valve arrangement. In the compression stage, the fluid flows from conduction point A via the valve arrangement (26) to conduction point B and in the rebound stage, from conduction point B via the valve arrangement (26) to conduction point A. However, proportional flow control valves generally have a different flow resistance for different flow directions. This has to be compensated by the control, for example. In the case of the rectifier circuit (27) shown in FIG. 4, the hydraulic fluid flows through the valve arrangement in the same direction in the rebound and compression stages. In the compression stage, the hydraulic fluid flows through the circuit in the following sequence: conduction point A, non-return valve (28*c*), valve arrangement (26), non-return valve (28*b*), conduction point B. In the rebound stage, the hydraulic fluid flows through the circuit in the following sequence: conduction point B, non-return valve (28*d*), valve arrangement (26), non-return valve (28*a*), conduction point A. Due to the wiring with the hydraulic rectifier circuit (27), a semi-active control of the damping procedure is possible.

In FIGS. 5 to 8, the regulating/control module (6) comprises a hydraulic fluid conveying means (31) which is operatively connected to the at least one hydraulic vibration damper (8, 8*a*, 8*b*). The hydraulic fluid conveying means (31) is fluidically interconnected to the at least one hydraulic vibration damper (8, 8*a*, 8*b*) such that the power of the compression stage and/or of the rebound stage can be modulated by the hydraulic fluid conveying means (31). The hydraulic fluid conveying means (31) has a controllable bidirectional pump (32) and a motor (33) for the pump (32). Thus, an active control of the damping procedure is possible by the hydraulic fluid conveying means (31).

Figure 5:
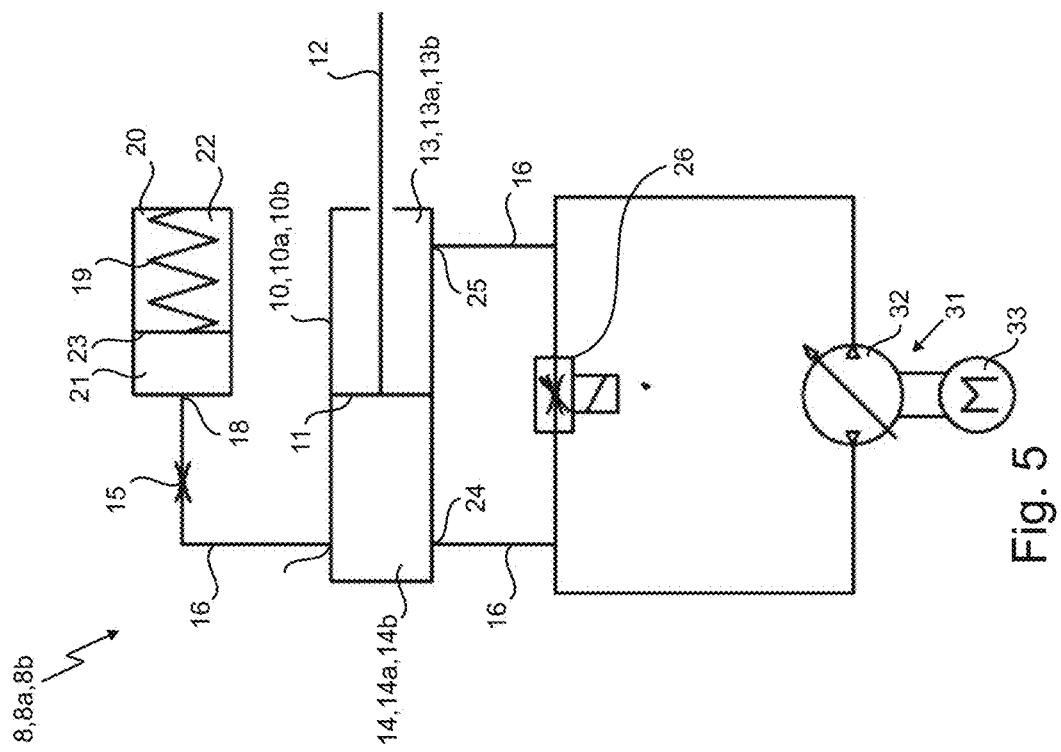
FIG. 5 is a schematic circuit diagram of a hydraulic vibration damper according to a further embodiment.

The circuit arrangement shown in FIG. 5 basically corresponds to the circuit arrangement of FIG. 3, although a hydraulic fluid conveying means (31) is connected parallel to the valve arrangement (26) or to the proportional flow control valve (26*a*) respectively. The hydraulic fluid conveying means (31) and the valve arrangement (26) are fluidically interconnected to the hydraulic vibration damper (8, 8*a*, 8*b*) such that the power of the compression stage and of the rebound stage can be modulated thereby in combination, as a result of which an active and a semi-active control of the damping procedure is possible.

Figure 6:
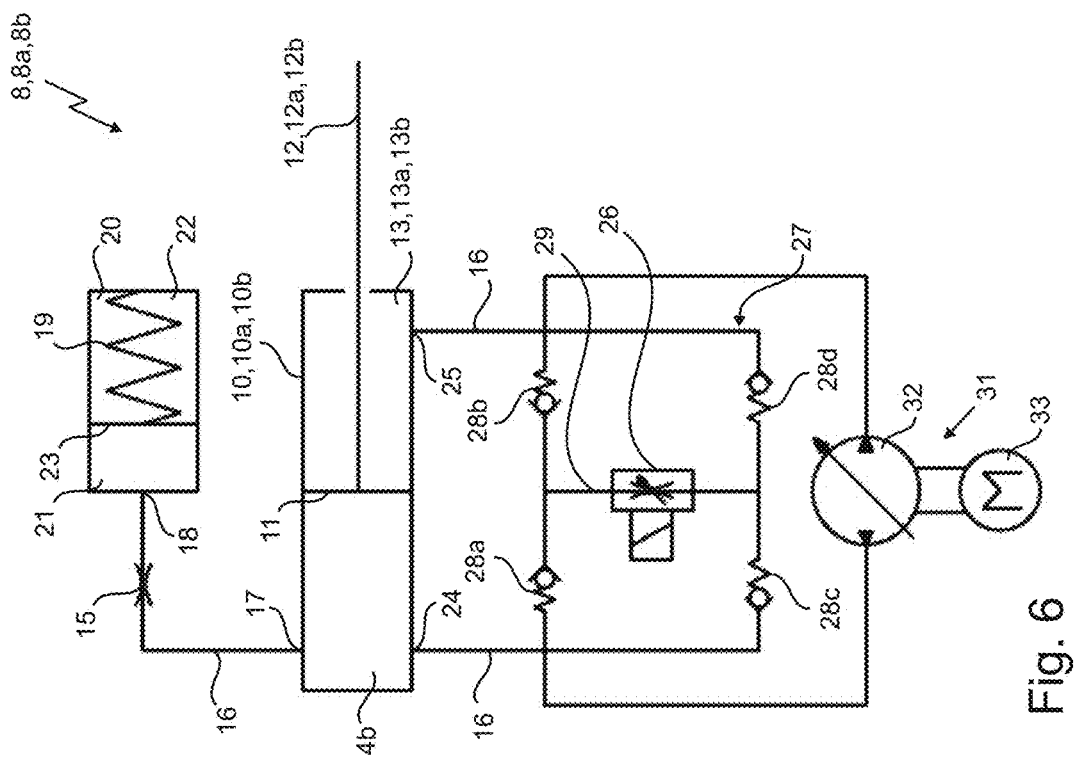
FIG. 6 is a schematic circuit diagram of a hydraulic vibration damper according to a further embodiment.

Furthermore, the circuit arrangement shown in FIG. 6 basically corresponds to the circuit arrangement of FIG. 4. However, here a hydraulic fluid conveying means (31) is connected parallel to the rectifier circuit (27). The hydraulic fluid conveying means (31) and the rectifier circuit (27) are fluidically interconnected to the hydraulic vibration damper (8, 8*a*, 8*b*) such that the power of the compression stage and of the rebound stage can be modulated thereby in combination, as a result of which an active and a semi-active control of the damping procedure is possible.

Figure 7:
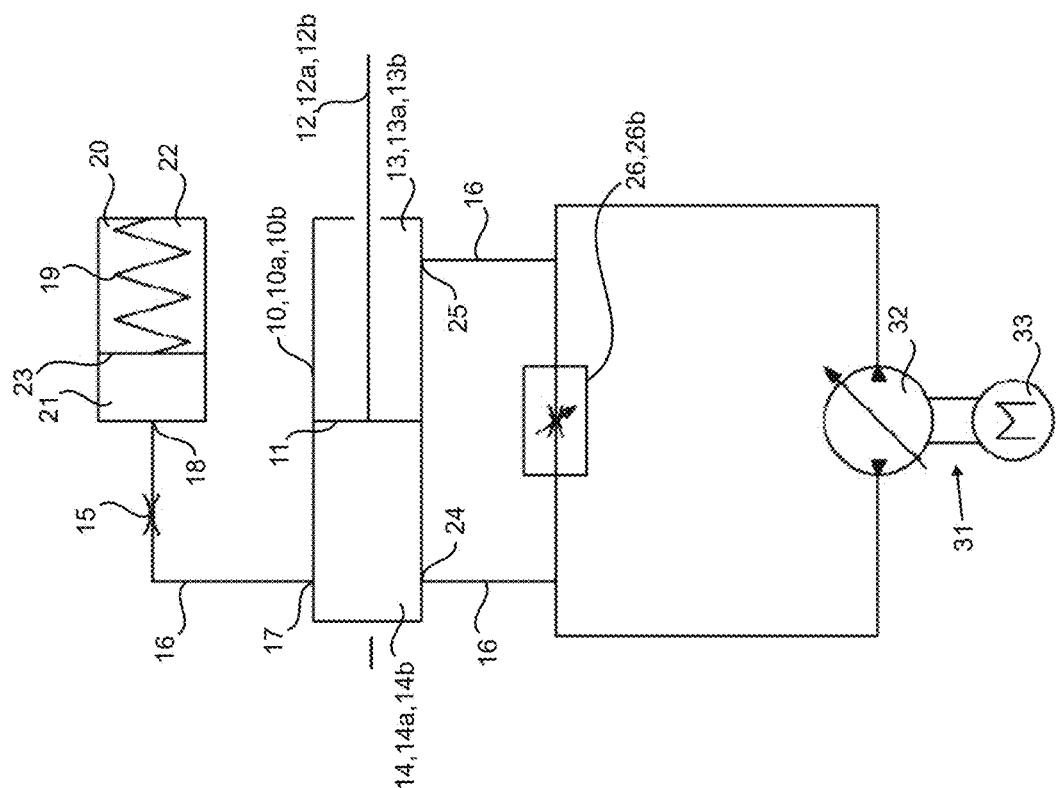
FIG. 7 is a schematic circuit diagram of a hydraulic vibration damper according to a further embodiment.

The embodiment in FIG. 7 basically corresponds to the embodiment of FIG. 5. However, here the valve arrangement (26) is configured as a manually actuatable throttle valve (26*b*). The rebound and compression stages of the hydraulic vibration damper (8, 8*a*, 8*b*) can be adjusted synchronously by this throttle valve. This corresponds to a passive damping control. A hydraulic fluid conveying means (31) is connected parallel to the manually actuatable throttle valve (26*b*). The hydraulic fluid conveying means (31) and the throttle valve (26*b*) are fluidically interconnected to the hydraulic vibration damper (8, 8*a*, 8*b*) such that the power of the compression stage and of the rebound stage can be modulated thereby in combination, as a result of which an active and a passive control of the damping procedure is possible.

Figure 8:
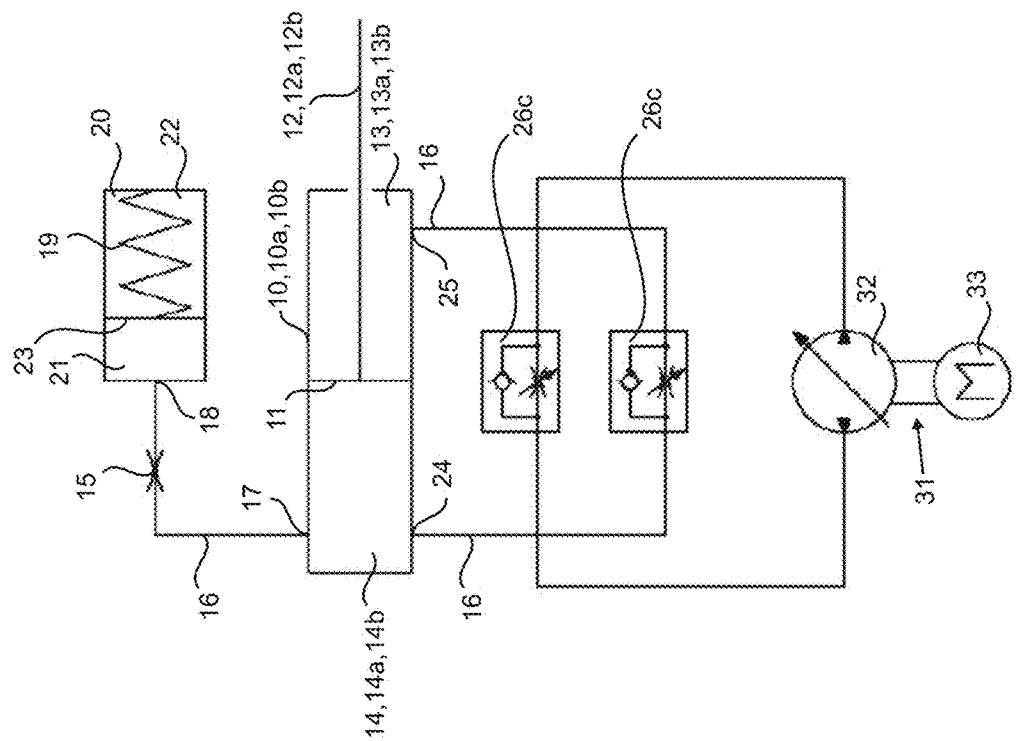
FIG. 8 is a schematic circuit diagram of a hydraulic vibration damper according to a further embodiment.

FIG. 8 shows a further embodiment which basically corresponds to the embodiment of FIG. 5. In this case, the valve arrangement (26) is configured by two manually actuatable throttle non-return valves (26*c*) which are connected in an anti-parallel manner. The rebound stage and the compression stage of the hydraulic vibration damper (8, 8*a*, 8*b*) can thus be adjusted separately by respectively one of the throttle non-return valves (26*c*). This corresponds to a passive asynchronous damping control. A hydraulic fluid conveying means (31) is connected parallel to the valve arrangement (26) consisting of the throttle non-return valves (26*c*). The hydraulic fluid conveying means (31) and the throttle valve (26*b*) are fluidically interconnected to the hydraulic vibration damper (8, 8a, 8b) such that the power of the compression stage and of the rebound stage can be modulated thereby in combination, as a result of which an active and a passive control of the damping procedure is possible.

Figure 10:
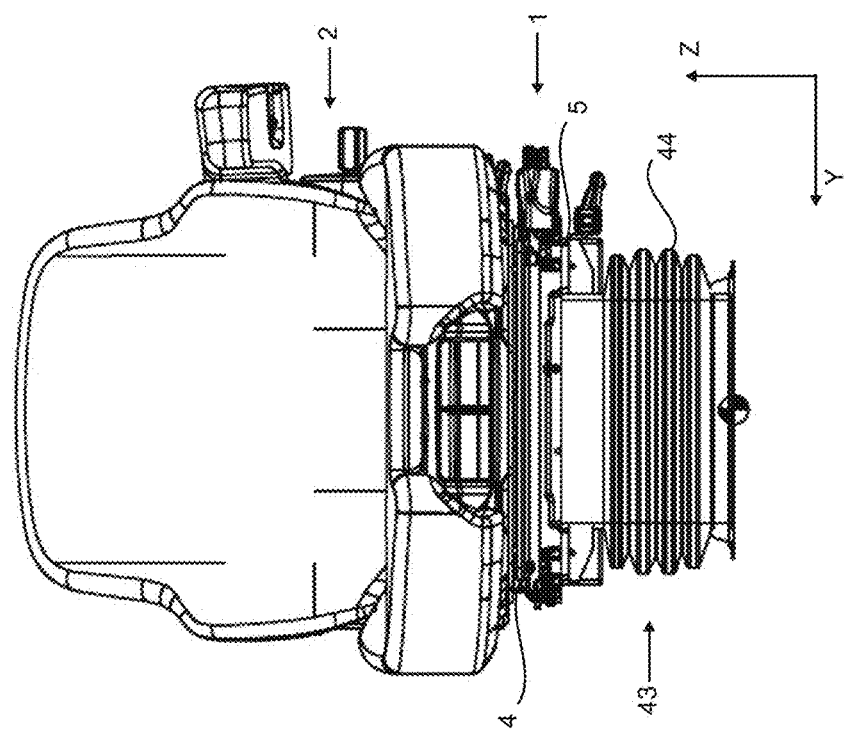
FIG. 10 is a side view of a vehicle seat with a vertical suspension and a horizontal vibration device.
Figure 11:
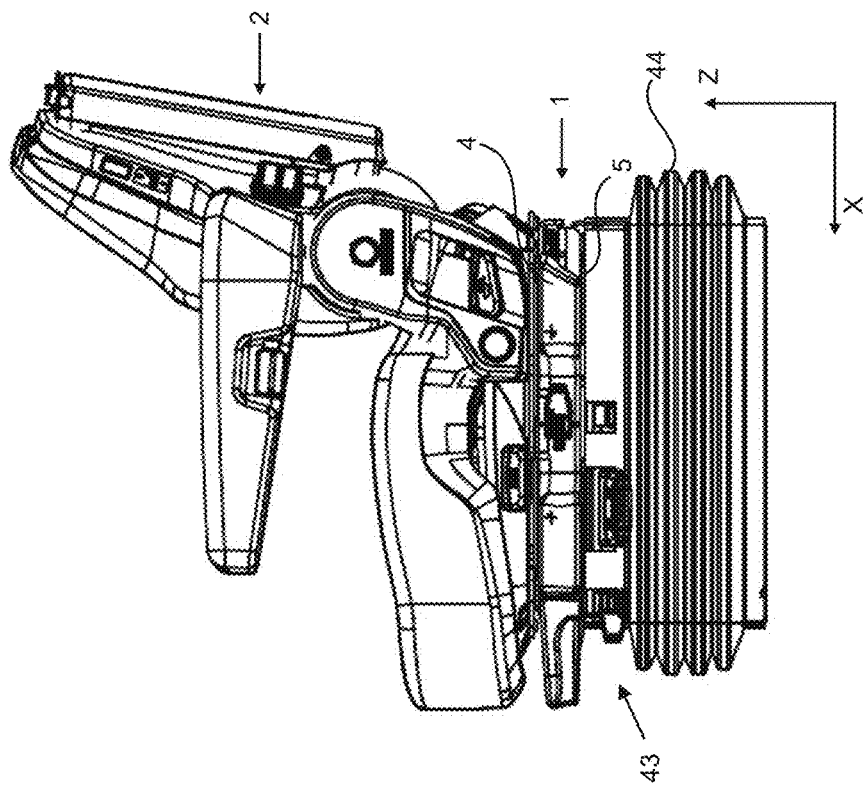
FIG. 11 is a rear view of a vehicle seat with a vertical suspension and a horizontal vibration device.

FIGS. 10 and 11 are respectively a side view and a rear view of a vehicle seat (2) having a horizontal vibration device (1). The vehicle seat (2) has a seat substructure (43) into which the horizontal vibration device (1) is integrated. A vertical suspension or a vibration damping means (44) respectively has also been integrated into the seat substructure (43).

All the features disclosed in the application documents are claimed as being essential to the invention provided that, on their own or in combination, they are novel over the prior art.

LIST OF REFERENCE SIGNS 1 horizontal vibration device
2 vehicle seat
3 damper module
4 seat-side upper part
5 body-side lower part
6 regulating/control module
6a fastening device of regulating/control module
7 interspace between seat-side upper part and body-side lower part
8 hydraulic vibration damper
8a first hydraulic vibration damper
8b second hydraulic vibration damper
9 volume equalising module
10, 10a, 10b hydraulic cylinder
11 piston
12, 12a, 12b piston rod
13 annular chamber
13a annular chamber of first hydraulic vibration damper
13b annular chamber of second hydraulic vibration damper
14 piston chamber
14a piston chamber of first hydraulic vibration damper
14b piston chamber of second hydraulic vibration damper
15 damping valve
16 pressure line
17, 17a, 17b first connection element of piston chamber
18 connection element of volume equalising module
19 pretensioning element
20 cylinder of volume equalising module
21 first chamber of cylinder of volume equalising module
22 second chamber of cylinder of volume equalising module
23 piston
24 second connection element of piston chamber
25 connection element of annular chamber
26 valve arrangement
26a proportional flow control valve
26b throttle valve
26c throttle non-return valve
27 hydraulic rectifier circuit
28a, 28b non-return valves
28c, 28d non-return valves
29 bridge diagonal
30, 30b bridge branch
31 hydraulic fluid conveying means
32 pump
33 motor
34 sensor means
35 basic body of sensor means
36 measuring arm of sensor means
37 guide system
38 fastening rail
39 centre axis
40, 40a, 40b connection element of annular chamber
41 underside of body-side lower part
42 middle position
43 seat substructure
44 vertical suspension
X longitudinal direction of vehicle
Y width direction of vehicle
Z height direction
α angle of rotation

What is claimed is:

1. A horizontal vibration device for a vehicle seat, comprising:
a damper module which damps horizontal vibrations between a seat-side upper part and a body-side lower part, wherein the seat-side upper part is arranged in a height direction (Z) of a vehicle above the body-side lower part, and wherein the height direction (Z) of the vehicle, a longitudinal direction (X) of the vehicle, and a width direction (Y) of the vehicle are substantially perpendicular to each other, and
a regulating/control module for regulating and/or controlling the damper module, said damper module being arranged in an interspace between the seat-side upper part and the body-side lower part, wherein the damper module comprises at least one hydraulic vibration damper, said at least one hydraulic vibration damper being fluidically connected to a volume equalising module, and said at least one hydraulic vibration damper being oriented in a horizontal plane defined by the longitudinal direction and the width direction of the vehicle.

2. The horizontal vibration device according to claim 1, wherein the at least one hydraulic vibration damper is a monotube damper, said monotube damper comprising a double-acting hydraulic cylinder which is divided by a piston having a piston rod into an annular chamber and a piston chamber, a damping valve being arranged in the piston and/or between the at least one hydraulic vibration damper and the volume equalising module, wherein the damping valve is configured to fix a flow resistance.

3. The horizontal vibration device according to claim 2, wherein the volume equalising module is fluidically connected to the piston chamber of the at least one hydraulic vibration damper, wherein a hydraulic fluid displaced in a compression stage of the at least one hydraulic vibration damper is delivered to the volume equalising module and the hydraulic fluid is delivered to the at least one hydraulic vibration damper from the volume equalising module in a rebound stage of the at least one hydraulic vibration damper, the volume equalising module and the piston chamber being fluidically connected by a pressure line, said pressure line being connected to a first connection element of the piston chamber and to a connection element of the volume equalising module.

4. The horizontal vibration device according to claim 1, wherein a hydraulic fluid, displaced in a compression stage of the at least one hydraulic vibration damper, is delivered to the volume equalising module, as a result of which a pretensioning element in the volume equalising module is compressed, wherein the hydraulic fluid which is driven by the now expanding pretensioning element is delivered to the at least one hydraulic vibration damper from the volume equalising module in a rebound stage of the at least one hydraulic vibration damper.

5. The horizontal vibration device according to claim 4, wherein the volume equalising module comprises a cylinder having a first chamber and a second chamber, said first chamber and second chamber being divided by a piston arranged such that the piston moves in the cylinder, wherein the hydraulic fluid delivered to the volume equalising module is delivered to the first chamber, as a result of which the pretensioning element, arranged in the second chamber is compressed.

6. The horizontal vibration device according to claim 1, wherein the regulating/control module is arranged outside the interspace between the seat-side upper part and the body-side lower part, the regulating/control module being fluidically connected to an annular chamber and to a piston chamber, the regulating/control module being connected by pressure lines to a second connection element of the piston chamber and to a second connection element of the annular chamber.

7. The horizontal vibration device according to claim 1, wherein the regulating/control module comprises a valve arrangement which is operatively connected to the at least one hydraulic vibration damper, the valve arrangement being fluidically interconnected to the at least one hydraulic vibration damper, such that the power of a compression stage and/or of a rebound stage is modulated by this valve arrangement, wherein the valve arrangement is controlled by a control/evaluation means.

8. The horizontal vibration device according to claim 1, wherein the regulating/control module comprises a hydraulic rectifier circuit which is configured as a full bridge having four non-return valves and is operatively connected to the at least one hydraulic vibration damper, a valve arrangement fluidically interconnected to the at least one hydraulic vibration damper such that the power of a compression stage and/or of a rebound stage is modulated by this valve arrangement, wherein the valve arrangement is controlled by a control/evaluation means, two non-return valves, connected in series being arranged in a respective branch of the full bridge, being oriented in an opposed manner.

9. The horizontal vibration device according to claim 1, wherein the regulating/control module comprises a hydraulic fluid conveying means which is operatively connected to the at least one hydraulic vibration damper, said hydraulic fluid conveying means being fluidically interconnected to the at least one hydraulic vibration damper such that the power of a compression stage and/or of a rebound stage is modulated by the hydraulic fluid conveying means, the hydraulic fluid conveying means having a controllable bidirectional pump and a motor for the pump.

10. The horizontal vibration device according to claim 8, wherein the hydraulic fluid conveying means and also a valve arrangement and/or a hydraulic rectifier circuit, configured as a full bridge, are operatively connected to the at least one hydraulic vibration damper, the hydraulic fluid conveying means, the valve arrangement and/or the rectifier circuit being fluidically interconnected to the at least one hydraulic vibration damper such that the power of the compression stage and/or of the rebound stage is modulated thereby in combination.

11. The horizontal vibration device according to claim 1, wherein the horizontal vibration device comprises at least one sensor means, said sensor means having a position sensor configured to measure the position of the seat-side upper part relative to the body-side lower part in at least one spatial direction, the sensor means having a speed sensor configured to measure the speed of the seat-side upper part relative to the body-side lower part in at least one spatial direction, the sensor means having an acceleration sensor configured to measure the acceleration of the seat-side upper part relative to the body-side lower part in at least one spatial direction, the regulating/control module comprising a control/evaluation means configured to evaluate the data of the sensor means and configured to control a valve arrangement and/or a hydraulic fluid conveying means.

12. The horizontal vibration device according to claim 11, wherein the sensor means comprises a basic body and a measuring arm which is arranged rotatably on the basic body, the basic body being arranged on the seat-side upper part and the measuring arm being arranged on the body-side lower part, or vice versa, the sensor means determining data such as position, speed and acceleration from the change in an angle of rotation of the measuring arm.

13. The horizontal vibration device according to claim 1, wherein the damper module comprises a first and a second hydraulic vibration damper, the first and the second hydraulic vibration damper being arranged in the longitudinal direction of the vehicle and/or in the width direction of the vehicle, an annular chamber of the first hydraulic vibration damper being fluidically connected to an annular chamber of the second hydraulic vibration damper, a piston chamber of the first hydraulic vibration damper being fluidically connected to a piston chamber of the second hydraulic vibration damper and to the volume equalising module.

14. The horizontal vibration device according to claim 1, wherein arranged in the interspace between the seat-side upper part and the body-side lower part is a guide system, by which the seat-side upper part is displaceably mounted on the body-side lower part.

15. The horizontal vibration device according to claim 7, wherein the valve arrangement is a proportional flow control valve.

16. The horizontal vibration device according to claim 8, wherein the valve arrangement is a proportional flow control valve arranged in a bridge diagonal of the full bridge.

* * * * *